(12) United States Patent
Lerner et al.

(10) Patent No.: US 7,545,555 B2
(45) Date of Patent: Jun. 9, 2009

(54) PROJECTION DEVICE

(75) Inventors: Scott Lerner, Corvallis, OR (US);
Anurag Gupta, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 283 days.

(21) Appl. No.: 11/045,777

(22) Filed: Jan. 27, 2005

(65) Prior Publication Data

US 2006/0164714 A1 Jul. 27, 2006

(51) Int. Cl.
*G02B 26/00* (2006.01)
*G02B 26/08* (2006.01)
(52) U.S. Cl. ...................... 359/291; 359/198
(58) Field of Classification Search ............ 359/198, 359/223–225, 237, 245, 290–292, 295, 298, 359/301–303, 317–318
See application file for complete search history.

(56) References Cited

U.S. PATENT DOCUMENTS

| 3,989,890 | A | | 11/1976 | Nathanson et al. |
| 5,168,351 | A | * | 12/1992 | Bradley et al. ............ 348/780 |
| 5,564,811 | A | | 10/1996 | Lim |
| 5,633,755 | A | * | 5/1997 | Manabe et al. ............ 359/443 |
| 6,188,519 | B1 | * | 2/2001 | Johnson ..................... 359/572 |
| 6,652,105 | B1 | | 11/2003 | Peterson et al. |
| 2002/0030893 | A1 | * | 3/2002 | Dewald et al. ............ 359/618 |
| 2004/0061926 | A1 | * | 4/2004 | Hunt ........................ 359/291 |
| 2004/0223088 | A1 | * | 11/2004 | Huibers ..................... 348/771 |

* cited by examiner

*Primary Examiner*—Scott J Sugarman
*Assistant Examiner*—Dawayne A Pinkney

(57) ABSTRACT

One embodiment of a projection device includes a modulator that reflects both imaging light and off-state light, and a projection lens including an optical plane, wherein the imaging light and the off-state light are both projected from the modulator to the optical plane.

35 Claims, 2 Drawing Sheets

PROJECTION DEVICE

BACKGROUND

Projection devices may include an optical modulator and a projection lens. The optical modulator creates images by modulating the light incident upon it. A reflective optical modulator that is based on an array of micro mirrors separates the illumination across the modulator during modulation into unusable light (off-state) and usable imaging light (on-state). The imaging light is projected through the projection lens to an observation plane. The off-state light is reflected out of the system prior to entering the projection lens. In order to reflect the off-state light out of the system prior to entering the projection lens, the projection lens may be positioned a relatively far distance from the optical modulator, which may result in unduly large projection lens systems. It may be desirable to position the projection lens closer to the optical modulator such that a smaller projection lens may be utilized.

DETAILED DESCRIPTION OF THE DRAWINGS

Figure 1:
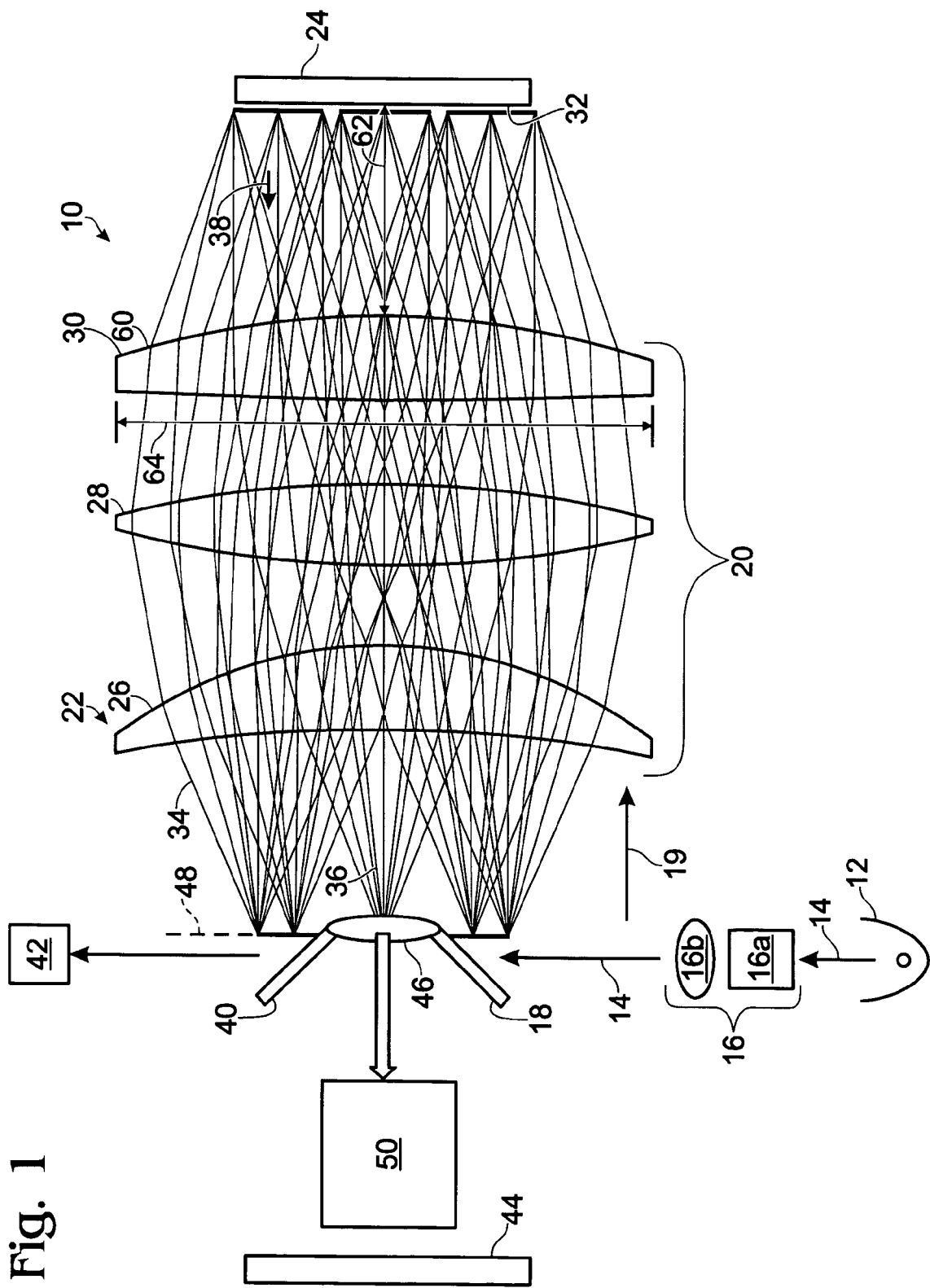
FIG. 1 is a schematic side view of one embodiment of a projection device.

FIG. 1 is a schematic side view of one embodiment of a projection device 10. Projection device 10 may be rear projection system, a front projection system, a direct view system or the like. For example, projection device 10 may be a television or a computer monitor, a digital camera, an interactive display system, or a display system including a direct view eye piece. Projection device 10 includes a light source 12, such as a white light source, namely a standard light bulb, or may be an arc lamp, a LED, a laser, or the like. Light source 12 projects a source light 14 through an illumination relay 16, which consists of a homogenizer 16a (such as integrating tunnel or rod) and a set of lenses 16b that direct the light into an optical pupil located substantially at plane 48. The turning mirror 18 helps in folding the light path. Turning mirror 18 reflects source light 14 in a first direction 19 through a first segment 20 of a projection lens 22 and to an optical modulator 24. First segment 20 of projection lens 22, in the particular embodiment shown, includes a first lens 26, a second lens 28 and a third lens 30. First lens 26 is a convex/flat lens, second lens 28 is a convex/convex lens, and third lens 30 is a convex/concave lens. In other embodiments, other lenses or arrangements of lenses may be utilized. Optical modulator 24 may be an array of micro-mirrors 32 (see FIG. 2) that can tilt independently to modulate the light falling across the modulator plane.

Modulator 24 may separate source light 14 into unusable off-state light 34 and usable imaging light 36 by the tilting of individual ones of micro-mirrors 32 as will be described in more detail below. Off-state light 34 and imaging light 36 are both reflected by modulator 24 in a second direction 38 and pass through first segment 20 of projection lens 22. Upon exiting first segment 20 of projection lens 22, off-state light 34 is positioned to impinge upon a second reflection device, such as a second turning mirror 40. Second turning mirror 40 reflects off-state light 34 to a light off-state 42, which may define a non-observation plane, such that the off-state light is not viewed by or projected to an observation plane 44. Upon exiting first segment 20 of projection lens 22, imaging light 36 is positioned to pass through an optical pupil 46 of projection lens 22 and to observation plane 44. Optical pupil 46 may define a lens, such as a convex/convex lens. First and second turning mirrors 18 and 40, and optical pupil 46 of projection lens 22, are all substantially positioned in a pupil plane 48 of projection lens 22. Accordingly, pupil plane 48 is positioned between first segment 20 and a second segment 50 pf projection lens 22.

Projection lens 22 may include a second segment, shown schematically as a lens set 50, that may be a refractive lens set, a reflective lens set, an absence of lenses, a catadioptric lens set, a zoom lens set, or the like, as suited for particular applications. Such lens sets are well know and are shown schematically, therefore, for ease of illustration. An "absence of lenses" may be defined as no lenses, i.e., nothing. Accordingly, in the embodiment wherein second segment 50 of projection lens 22 includes an absence of lenses, pupil plane 48 of the projection lens 22 may be positioned at an outside edge of lens 22.

Optical pupil 46 of projection lens 22 is positioned between first and second segments 20 and 50 of projection lens 22. Accordingly, off-state light 34 passes through a portion of projection lens 22, such as first segment 20. Accordingly, a leading edge 60 of projection lens 22 may be positioned a relatively short distance 62 from modulator 24, such as a distance of 24 millimeters (mm) or less, and more particularly, 15 mm or less. In one embodiment, leading edge 60 of projection lens 22 is positioned abutting modulator 24 such that distance 62 may be approximately zero. Such relatively close placement of leading edge 60 of projection lens 22 with respect to modulator 24 allows utilization of a relatively small sized projection lens 22. Utilization of a projection lens having a small size may reduce the cost of the projection lens, thereby reducing the cost of manufacturing projection device 10.

Figure 2:
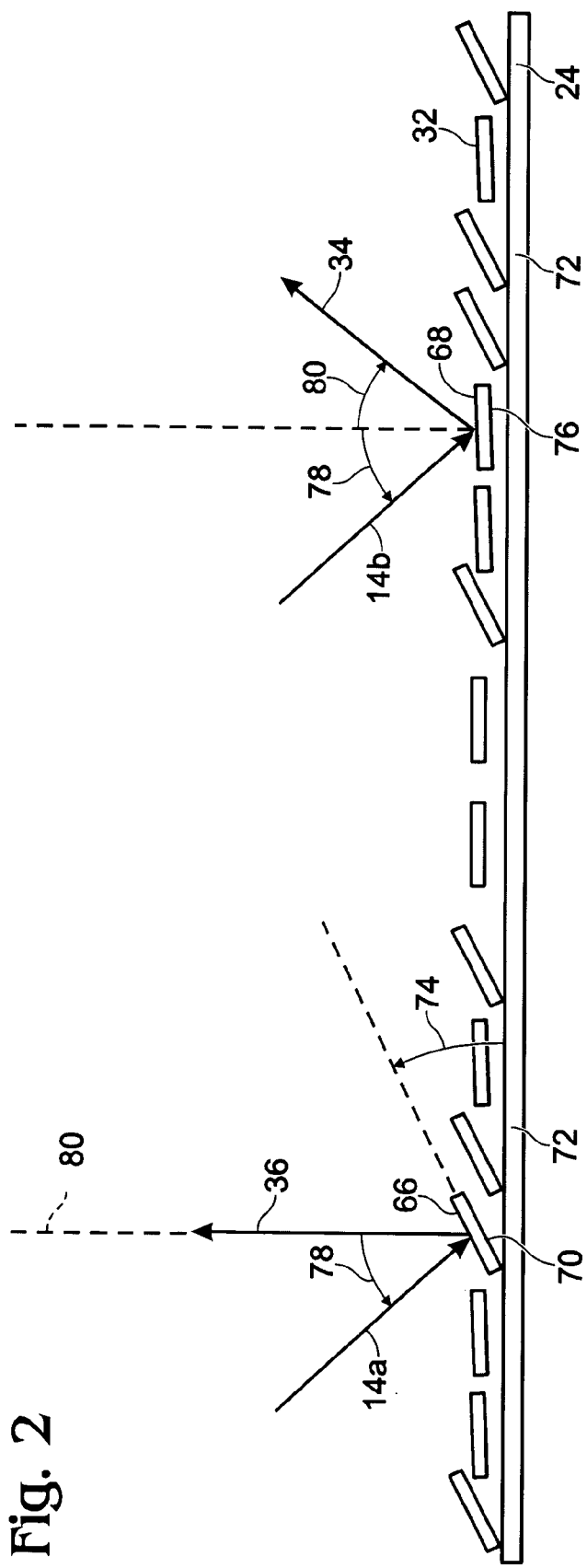
FIG. 2 is a schematic side view of one embodiment of an optical modulator, showing individual micro-mirrors, some shown in an on state and some shown in an off state.

FIG. 2 is a schematic side view of one embodiment of optical modulator 24, showing a reflective structures, such as individual micro-mirrors 32, some shown in an "on" state 66 (i.e., tilted,) and some shown in an "off" state 68 (i.e., untilted). In one embodiment of modulator 24, each of mirrors 32 (of FIG. 1) may define a pixel, and modulator 24 may include at least one megapixels. Each of mirrors 32 may be individually addressed such that each of the plurality of mirrors may be tilted or untilted as desired. In the on state 66, an individual mirror 70 may be tilted with respect to a substrate 72 through an angle 74.

In the embodiment shown, angle 74 may be an angle of fifteen degrees or less (in this figure the angles are not drawn to scale for ease of illustration), and in particular, may be an angle of thirteen degrees or less, and more particularly, may be an angle of approximately twelve degrees. However, the angle may have any absolute value greater than zero degrees. For example, the angle may be three degrees or negative three degrees. In the off state 68, an individual mirror 76 may be untilted with respect to substrate 72 such that mirror 76 may be positioned substantially parallel to substrate 72. Accordingly, in this embodiment, a portion 14a of source light 14 may be directed toward modulator 24 at an angle 78 of approximately twelve degrees with respect to a line 80 substantially perpendicular to substrate 72. Mirror 70 may be tilted with respect to substrate 72 through angle 74 of approximately twelve degrees such that light 14a is reflected as usable imaging light 36 substantially along line 80, i.e., substantially perpendicular to substrate 72. A portion 14b of source light 14 may also be directed toward modulator 24 at angle 78 of approximately twelve degrees with respect to line

80. Mirror 76 may be untilted with respect to substrate 72 such that light 14b is reflected as unusable off-state light 34 at an angle 80 of approximately twelve degrees with respect to line 80.

Due to the relatively close positioning of leading edge 60 of projection lens 22 to modulator 24 (see FIG. 1), which may be facilitated by projecting off-state light 34 through first segment 20 of projection lens 22, the individual mirrors 32 of modulator 24 may be tilted through a relatively small angle (i.e., an angle of fifteen degrees or less) in order to separate usable imaging light 36 from unusable off-state light 34. Such a relatively small angle of tilt of micro-mirrors 32 between the on and off states 66 and 68, may facilitate manufacturing modulator 24 at a reduced cost and may facilitate higher operating speeds of modulator 24 than heretofore achieved. In other embodiments, mirrors 32 may be movably mounted on a substrate 72 such that light impinging on the mirrors may be reflected in one of any number of different directions and any number of different angles.

Other variations and modifications of the concepts described herein may be utilized and fall within the scope of the claims below.

We claim:

1. A projection device, comprising:
   a modulator that reflects both imaging light and off-state light;
   a projection lens including an optical plane, wherein said imaging light and said off-state light are both directed from said modulator through at least a portion of said projection lens to said optical plane; and
   a reflection device positioned at said optical plane, wherein said off-state light is reflected by said reflection device.

2. The device of claim 1 wherein said reflection device comprises a turning mirror and wherein said imaging light passes through said optical plane.

3. The device of claim 1 wherein said projection lens comprises a first segment and a second segment, and wherein said optical plane is positioned therebetween.

4. The device of claim 3 wherein said second segment is chosen from one of a refractive lens set, a reflective lens set, an absence of lenses, a catadioptric lens set, and a zoom lens set.

5. The device of claim 1 further comprising a light source and an illumination relay that relays light from said source to said modulator.

6. The device of claim 1 wherein said modulator comprises a plurality of micro-mirrors that individually move between on and off states.

7. The device of claim 6 wherein said micro-mirrors move through an angle of at most 13 degrees between said on and off states.

8. The device of claim 1 further comprising an observation plane, wherein only said imaging light is relayed to said observation plane.

9. The device of claim 1 wherein a leading edge of said projection lens is positioned at most 24 millimeters from said modulator.

10. A method of projecting light, comprising:
    projecting imaging light and offstate light from a modulator through at least a portion of a projection lens to an optical pupil of said projection lens;
    reflecting said off-state light to a non-observation plane by a reflection device positioned at said optical pupil; and
    passing said imaging light through said optical pupil to an observation plane.

11. The method of claim 10 further comprising further passing said imaging light through a second portion of said projection lens, said second portion positioned on ar. opposite side of said optical pupil from said portion.

12. The method of claim 10 wherein said reflection device comprises a turning mirror.

13. The method of claim 10 wherein said projecting imaging light comprises placing selected ones of individual mirrors of said modulator in a first condition and, wherein said projecting off-state light comprises placing other selected ones of said individual mirrors of said modulator in a second condition.

14. The method of claim 13 wherein said mirrors are tilted between said first condition and said second condition through an angle of at most 15 degrees.

15. The method of claim 10, prior to said projecting, further comprising projecting a source light to said modulator from a light source.

16. The method of claim 15 wherein a portion of said source light is reflected by said modulator as said imaging light and, a remainder of said source light is reflected by said modulator as said offstate light.

17. The method of claim 11 wherein said remainder of said projection lens is chosen from one of a zoom lens set, a wide-angle lens set, and an absence of lenses 18. A projection system, comprising:
    a projection lens that defines an optical plane including an optical pupil;
    an optical modulator that reflects both off-state light and imaging light through at least a portion of said projection lens to said optical plane; and
    a reflection device positioned at said optical plane, wherein said off-state light is further reflected by said reflection device.

19. The system of claim 18 wherein said imaging light is reflected through said optical pupil.

20. The system of claim 18 wherein said optical plane is a pupil plane of said projection lens.

21. The system of claim 18 wherein said optical modulator is a micro-mirror array including a plurality of movable micro-mirrors.

22. The system of claim 18 wherein said projection lens comprises a first segment and a second segment and wherein said optical plane is positioned between said first and second segments.

23. The system of claim 22 wherein said optical modulator reflects both said off-state light and said imaging light through said first segment of said projection lens to said optical plane.

24. The system of claim 18 wherein said projection lens is chosen from one of a zoom lens set and a wide-angle lens set.

25. The system of claim 18 wherein imaging light passing through said optical pupil is directed by the projection lens at an observation plane.

26. The system of claim 18 wherein said system comprises one of a rear projection system, a front projection system, and a direct view system.

27. An imaging device, comprising:
    means for separating source light into imaging light and non-imaging light;
    means for projecting including a pupil plane therein; and
    means for reflecting positioned at said pupil plane,
    wherein said means for projecting projects said imaging light from said means for separating and through said pupil plane, and
    wherein said means for projecting projects said non imaging light from said means for separating and to said means for reflecting.

28. The device of claim 27 wherein said means for separating comprises a digital light processor.

29. The device of claim 27 wherein said means for separating comprises a mirror array including mirrors that tilt between an imaging state and a non-imaging state through an angle of at most fifteen degrees.

30. The device of claim 27 wherein said means for projecting comprises a projection lens set including an optical pupil positioned at said pupil plane.

31. The device of claim 27 wherein said means for reflecting comprises a turning mirror.

32. The device of claim 1 wherein said modulator reflects said imaging light along a first path to said optical plane and reflects said off-state light along a second path to said optical plane, said second path different from said first path.

33. The device of claim 1 wherein said optical plane defines a plane of focus of said projection lens.

34. The method of claim 10 wherein said imaging light is non-collimated.

35. The system of claim 18 wherein said optical modulator is a non-diffractive optical modulator.

* * * * *

UNITED STATES PATENT AND TRADEMARK OFFICE
CERTIFICATE OF CORRECTION

PATENT NO. : 7,545,555 B2  Page 1 of 1
APPLICATION NO. : 11/045777
DATED : June 9, 2009
INVENTOR(S) : Scott Lerner et al.

It is certified that error appears in the above-identified patent and that said Letters Patent is hereby corrected as shown below:

In column 3, line 59, in Claim 10, delete "offstate" and insert -- off-state --, therefor.

In column 4, line 1, in Claim 11, delete "ar." and insert -- an --, therefor.

In column 4, line 20, in Claim 16, delete "offstate" and insert -- off-state --, therefor.

In column 4, line 23, in Claim 17, delete "lenses" and insert -- lenses. --, therefor.

In column 4, lines 65-66, in Claim 27, delete "non imaging" and insert -- non-imaging --, therefor.

Signed and Sealed this

Third Day of November, 2009

David J. Kappos
*Director of the United States Patent and Trademark Office*